(12) United States Patent
Boodannavar et al.

(10) Patent No.: US 12,726,913 B2
(45) Date of Patent: Sep. 1, 2026

(54) CROSS-CHANNEL SIGNAL STRENGTH MEASUREMENT CORRECTION FOR WIRELESS COMMUNICATION

(71) Applicant: Apple Inc., Cupertino, CA (US)

(72) Inventors: Veerendra Boodannavar, Cupertino, CA (US); Aniruddha S. Diwan, San Jose, CA (US)

(73) Assignee: Apple Inc., Cupertino, CA (US)

(*) Notice: Subject to any disclaimer, the term of this patent is extended or adjusted under 35 U.S.C. 154(b) by 735 days.

(21) Appl. No.: 17/952,151

(22) Filed: Sep. 23, 2022

(65) Prior Publication Data

US 2023/0354214 A1 Nov. 2, 2023

Related U.S. Application Data

(60) Provisional application No. 63/336,990, filed on Apr. 29, 2022.

(51) Int. Cl.
*H04W 52/24* (2009.01)
*H04B 17/318* (2015.01)
*H04W 84/12* (2009.01)

(52) U.S. Cl.
CPC ........ *H04W 52/245* (2013.01); *H04B 17/318* (2015.01); *H04W 84/12* (2013.01)

(58) Field of Classification Search
CPC ... H04W 52/245; H04W 84/12; H04W 52/08; H04W 52/146; H04W 52/30; H04W 52/34; H04W 52/357; H04W 52/00; H04B 17/318; H04B 7/0426; H04B 10/564; Y02D 30/70
See application file for complete search history.

(56) References Cited

U.S. PATENT DOCUMENTS

| | | | | |
|---|---|---|---|---|
| 8,811,426 | B1 * | 8/2014 | Banerjea | H04W 72/02 370/468 |
| 12,471,130 | B2 * | 11/2025 | Lin | H04W 72/542 |
| 2009/0067403 | A1 * | 3/2009 | Chan | H04W 16/10 370/310 |
| 2015/0271829 | A1 * | 9/2015 | Amini | H04W 24/02 370/329 |
| 2015/0373741 | A1 * | 12/2015 | Yerramalli | H04W 74/0808 370/336 |
| 2016/0050634 | A1 * | 2/2016 | Seok | H04W 52/146 370/338 |
| 2016/0249361 | A1 * | 8/2016 | Li | H04L 5/0064 |
| 2017/0059687 | A1 | 3/2017 | Dinesh et al. | |
| 2018/0077654 | A1 * | 3/2018 | Kulkarni | H04W 52/245 |
| 2018/0242332 | A1 * | 8/2018 | Feng | H04L 67/51 |
| 2019/0215884 | A1 * | 7/2019 | Patil | H04W 74/004 |
| 2019/0306835 | A1 * | 10/2019 | Hoang | H04W 72/53 |
| 2023/0124501 | A1 * | 4/2023 | Lin | H04W 24/08 370/252 |
| 2025/0048424 | A1 * | 2/2025 | Chung | H04W 48/16 |

* cited by examiner

*Primary Examiner* — Angelica Perez
(74) *Attorney, Agent, or Firm* — BAKERHOSTETLER

(57) ABSTRACT

The subject disclosure provides systems and methods for improved signal strength determination for wireless communication. A client device may determine a corrected signal strength, corresponding to a network connection to an access point, by applying a correction to a measured signal strength. The correction may be based on a channel width for the connection.

20 Claims, 6 Drawing Sheets

CROSS-CHANNEL SIGNAL STRENGTH MEASUREMENT CORRECTION FOR WIRELESS COMMUNICATION

CROSS REFERENCE TO RELATED APPLICATIONS

This application claims the benefit of priority to U.S. Provisional Patent Application No. 63/336,990, entitled, "Cross-Channel Signal Strength Measurement Correction for Wireless Communication", filed on Apr. 29, 2022, the disclosure of which is hereby incorporated herein in its entirety.

TECHNICAL FIELD

The present description relates generally to wireless communication, including, for example, cross-channel signal strength measurement correction for wireless communication.

BACKGROUND

Electronic devices often communicate over wireless networks using WiFi protocols defined by the 802.11 standards.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
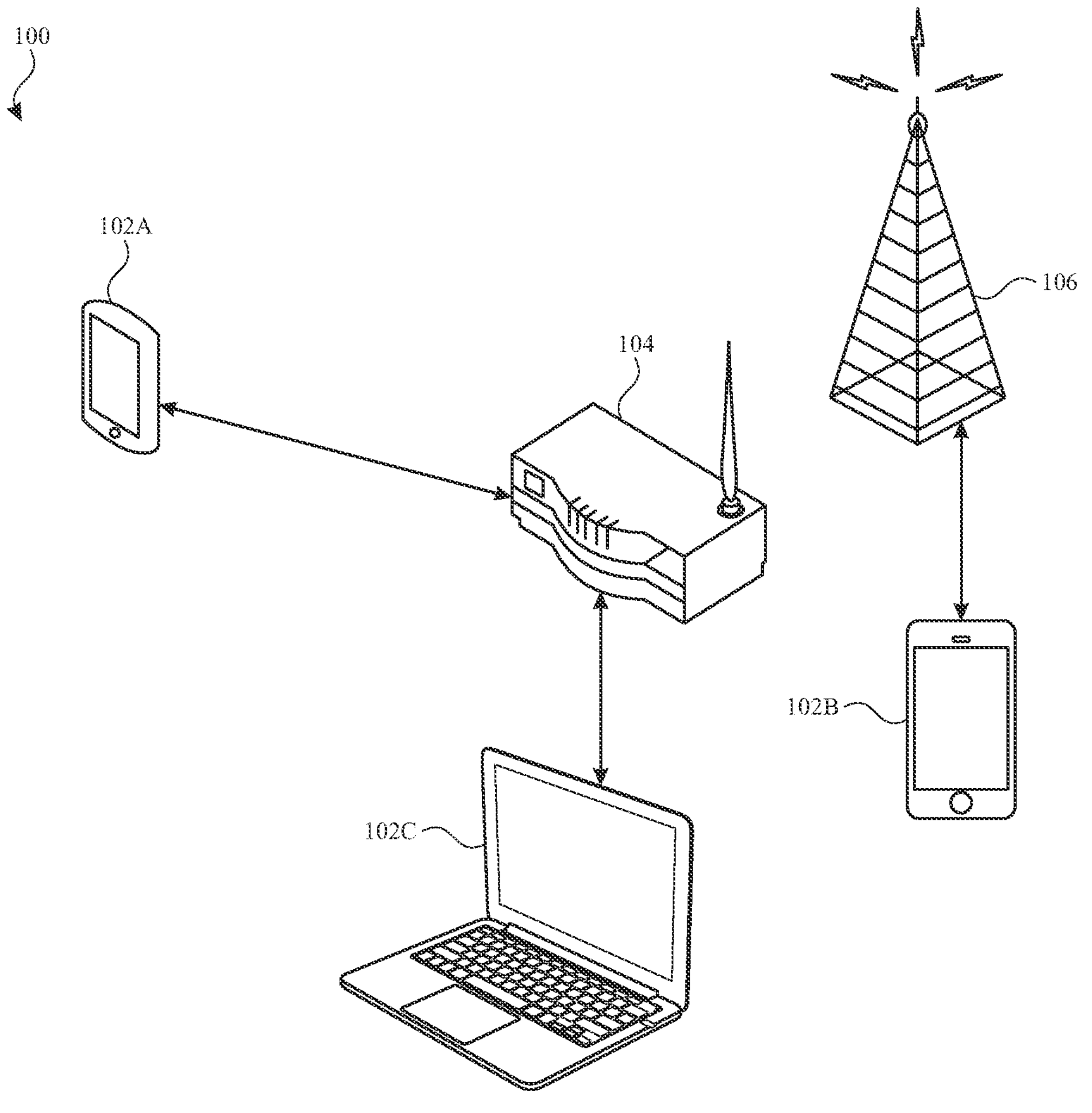
FIG. 1 illustrates an example network environment in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices that communicate over WiFi networks often measure a signal strength for the WiFi connection. Aspects of the operation of the electronic device can then be controlled based on the signal strength. As examples, an electronic device may display an indicator of the signal strength to a user on a display of the electronic device, may determine a distance between the electronic device and an access point (AP) based on the signal strength, and/or manage network connections based on the signal strength and/or the distance determined using the signal strength. For example, an electronic device may use the signal strength and/or the distance to determine when to scan for other WiFi networks and/or access points, and/or when to switch to a different communication modality, such as switching to a cellular network from a WiFi network.

Electronic devices (also referred to herein as WiFi clients or client devices) typically compute a signal strength (e.g., a Received Signal Strength Indicator, or RSSI) using frames that are transmitted from an AP using robust communication, such as beacons and/or probe responses. Access points typically send beacons and probe responses in a 20 MHz channel. However, other channels used for WiFi communication (e.g., 40 MHz channels, 80 MHz channels, 160 MHz channels, etc.) may have different noise floors than individual 20 MHz channels. These differences can, in some implementations, cause differences in the signal strengths in those channels.

In one particular example, the 6E WiFi standard indicates that an access point (AP) should send beacon frames in a 20 MHz channel and, and should also send 40 MHz, 80 MHz, and 160 MHz communications at increasingly higher transmit (TX) power than the transmit power of 20 MHz communications. This increase in TX power is to account, for example, for a difference in the Effective Isotropic Radiated Power (EIRP) for the frames sent in a 20 MHz channel as opposed frames sent in a 40 MHz, 80 MHz, or 160 MHz channel. This means that a signal strength computed on beacon frames received in a 20 MHz channel may not be accurate for a corresponding 160 MHz channel.

The subject technology provides for improved signal strength measurements for WiFi communication, including for WiFi channels with 40 MHz and higher channel widths. In one or more implementations, a signal strength may be measured using one or more beacons received on a 20 MHz channel, and a correction that is based on a channel width of another channel may be applied to the measured signal strength to determine a corrected signal strength for that other channel. The corrected signal strength may then be used for subsequent operations of the electronic device. In one or more other implementations, the signal strength may be determined using data frames transmitted in a wider channel. For example, in these implementations, the signal strength may be measured based on a signal strength measured using one or more beacons received on a 20 MHz channel and based on a signal strength determined using data received over a higher width channel, without applying a correction to the signal strength that is determined based on a combination of both beacons and data frames.

Aspects of the subject system allow devices to avoid unnecessarily reducing the range of a WiFi channel having a channel width above 20 MHz, by adjusting a signal strength measurement performed in a 20 MHz channel to account for the increased TX power for transmissions from an AP in the higher width channels.

FIG. 1 illustrates an example network environment 100 for cross-channel signal strength measurement correction in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-102C, a wireless access point 104, and a base station 106. One or more of the electronic devices 102A-102C may include, may be a component of, and/or may be referred to as, a User Equipment (UE), station (STA), a client device, or terminal device. One or more of the electronic devices 102A-102C may include suitable logic, circuitry, interfaces, memory, and/or code that enables communications, e.g., with one or more of the wireless access point 104 or the base station 106, via wireless interfaces and utilizing one or more radio transceivers, such as WiFi and/or cellular transceivers. One or more of the electronic devices 102A-102C may also be operable to communicate wirelessly with one or more other user devices, one or more other base stations, and/or one or more other access points not shown in FIG. 1.

One or more of the electronic devices 102A-102C may be, for example, a portable computing device such as a laptop device, a smartphone, a peripheral device (e.g., a digital camera, headphones), a smart television device, a tablet device, a wearable device such as a watch, a band, and the like, or any other appropriate device that includes, for example, one or more wireless interfaces, such as wireless local area network (WLAN) radios, Wi-Fi radios, cellular radios, Bluetooth radios, Zigbee radios, near field communication (NFC) radios, and/or other wireless radios. In FIG. 1, by way of example, the electronic device 102A is depicted as a tablet device, the electronic device 102B is depicted as a mobile device, and the electronic device 102C is depicted as a laptop device. One or more of the electronic devices 102A-102C may be, and/or may include all or part of, the electronic device discussed below with respect to FIG. 2, and/or the electronic system discussed below with respect to FIG. 9.

The base station 106 may be a component of, and/or may be referred to as, a cell, a node B (NB), an evolved universal mobile telecommunications system (UMTS) terrestrial radio access network (E-UTRAN) node B, an evolved nodeB (eNodeB or eNB), and the like. The base station 106 may include suitable logic, circuitry, interfaces, memory, and/or code that enable cellular communications, e.g., with one or more of the electronic devices 102A-102C and/or other base stations (not shown), via wireless interfaces and utilize one or more radio transceivers.

In one or more implementations, the base station 106 may be a base station of a cellular-based wireless network, such as a long term evolution (LTE) communications network, global system for mobile (GSM) communications network, UMTS communications network, or generally any cellular-based communications network. The base station 106 may utilize an unlicensed spectrum for cellular communications, such as in a carrier aggregation procedure, e.g., in licensed assisted access (LAA) communication. Thus, the cellular communications may include communications over licensed spectrum, such as spectrum licensed by the mobile network operator associated with the base station 106, and/or communications over unlicensed spectrum, such as, for example, the 5 GHz spectrum. The base station 106 may be, and/or may include all or part of, the electronic device discussed below with respect to FIG. 2, and/or the electronic system discussed below with respect to FIG. 9.

In the example of FIG. 1, the electronic device 102A and the electronic device 102C are illustrated as participating in WiFi communications with the access point 104. In the example of FIG. 1, the electronic device 102B is illustrated as participating in cellular communications with the base station 106. However, the electronic device 102B may also participate in WiFi communications with the wireless access point 104, such as concurrently with or separately from the cellular communications with the base station 106.

The wireless access point 104 may include, may be a component of, and/or may be referred to as, a WLAN access point or AP. The wireless access point 104 includes suitable logic, circuitry, interfaces, memory, and/or code that enable WiFi communications, e.g., with one or more of the electronic devices 102A-102C via wireless interfaces and utilize one or more radio transceivers. The WiFi communications may include communications over one or more of a 2.4 GHz band, a 5 GHz band, a 6 GHz band, and/or other band utilized for WiFi communications. Within each band, the electronic devices 102A-102C and the access point 104 may communicate over various channels having various channel widths, such as a 20 MHz channel width, a 40 MHz channel width, an 80 MHz channel width, a 160 MHz channel width, a 320 MHz channel width, etc. The wireless access point 104 may be, and/or may include all or part of, the electronic device discussed below with respect to FIG. 2, and/or the electronic system discussed below with respect to FIG. 9.

Figure 2:
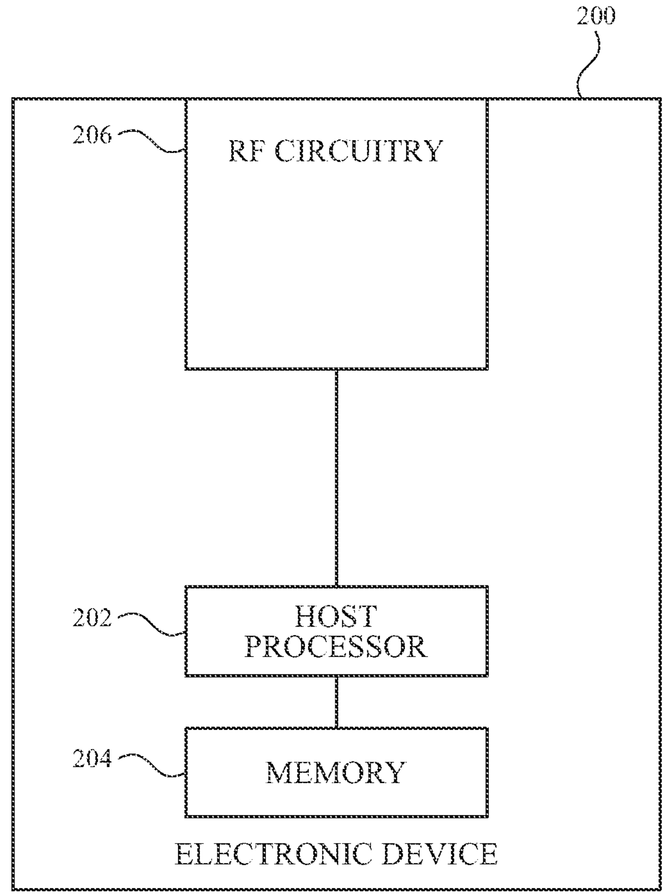
FIG. 2 illustrates an example device that may implement a system for cross-channel signal strength measurement correction for wireless communication in accordance with one or more implementations.

FIG. 2 illustrates an example device that may implement a system for wireless communication in accordance with one or more implementations. For example, the device 200 of FIG. 2 can correspond to any of the electronic devices 102A-102C and/or the wireless access point 104 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, and a communication interface 206. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one of the electronic devices 102A-102C and/or the wireless access point 104 of FIG. 1, the memory 204 may store applications and/or services for generating data streams and/or for generating and providing communication to others of the electronic devices 102A-102C and/or the wireless access point 104 of FIG. 1 and/or for receiving and/or processing communication from others of the electronic devices 102A-102C and/or the wireless access point 104 of FIG. 1. In one or more implementations, the memory 204 may store instructions for determining a signal strength according to the subject matter described herein.

The communication interface 206 may include suitable logic, circuitry, and/or code that enables wired or wireless communication, such as between any of the electronic devices 102A-102C, the AP 104, and/or the base station 106. The communication interface 206 may include, for example, one or more of a Bluetooth communication interface, a cellular interface, an NFC interface, a Zigbee communication interface, a WLAN communication interface, a WiFi communication interface, a USB communication interface, or generally any communication interface.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

In one or more implementations, the AP 104 may transmit frames in a 40 MHz channel with, e.g., 3 dB more power than in a 20 MHz channel, with, e.g., 6 dB power more in a 80 MHz channel than in a 20 MHz channel, and with, e.g., 9 dB more power in a 160 MHz channel than in a 20 MHz channel. In the subject system, one or more of the electronic devices 102A-102C, such as the electronic device 102A, may be utilizing WiFi communication to receive data over a first channel with a first channel width (e.g., 40 MHz, 80 MHz, or 160 MHz). The electronic device may determine a signal strength for the communication over that channel using one or more beacon frames (beacons) and/or one or more probe response frames (probe responses) received from the AP 104 over another channel having a different channel width (e.g., a 20 MHz channel). In order to avoid determining an incorrect signal strength in that first channel, the electronic device 102A may determine a signal strength using one or more beacons received over the 20 MHz channel, determine a correction that is based on the first channel width, and apply the correction to the determined signal strength to determine a corrected signal strength for the first channel. The corrected signal strength may then be used for subsequent operation of the electronic device.

Figure 3:
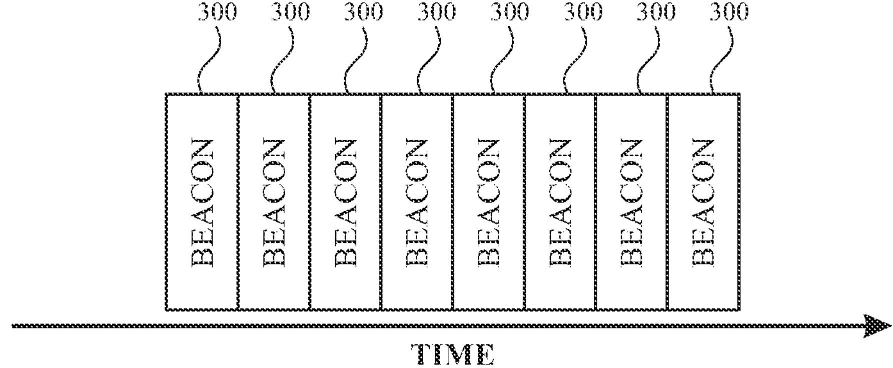
FIG. 3 illustrates an example timing diagram for transmission of beacon frames in accordance with one or more implementations.

For example, FIG. 3 illustrates an example timing diagram in which multiple beacon frames 300 (also referred to herein as beacons) are transmitted from the AP 104 to the electronic device 102A. Beacon frames 300 from an access point may include a timestamp, a beacon interval, capability information for the access point, supported rates for the access point, a service set identifier, and/or other information for the access point. Beacon frames 300 may be, for example, 20 MHz beacon frames from AP 104, and may be transmitted over a channel having a 20 MHz channel width. The channel having the 20 MHz channel width may be a separate 20 MHz channel or may be sub-channel of a wider channel (e.g., a 40 MHz channel, an 80 MHz channel, a 160 MHz channel etc.) over which data frames are being transmitted. In one or more implementations, a separate 20 MHz channel and/or a 20 MHz sub-channel of a wider channel may be aligned with a preferred scanning channel of the WiFi network (e.g., as determined by the AP 104 and/or by or within a WiFi standard such as WiFi 6 or WiFi 6E (802.11ax)).

In the example of FIG. 3, eight beacon frames 300 are shown. In one or more implementations, the electronic device 102A may determine a signal strength based on (as examples) one, two, three, four, five, six, seven, or eight of the beacon frames 300 (e.g., based on an average of the beacon frames 300, such as a weighted average of the beacon frames 300 such as a weighted average in which later (more recent) beacon frames are weighted more heavily than earlier beacon frames). The average and/or the weighted average signal strength may be a moving average that updates using the most recent beacon frames within a moving window having a fixed length in time. Determining a signal strength based on an average of multiple beacon frames 300 can include averaging one or more aspects of the beacon frames and determining the signal strength from the average of the multiple beacon frames 300, or determining a signal strength corresponding to each of the multiple beacon frames 300 and then averaging the determined signal strengths. Although a series of frames including only beacon frames 300 is illustrated in FIG. 3, a signal strength based on an average of multiple beacon frames 300 can be determined using beacon frames 300 that are not all adjacent frames (e.g., beacon frames 300 that are interleaved with data frames or other network management communications).

In use cases in which the electronic device 102A is associated with a channel and/or engaged in active (e.g., data) communication over a channel having the same width as the channel over which the beacon frames 300 are received, the electronic device 102A may forego applying a correction to the signal strength that is determined based on the beacon frame average. In use cases in which the electronic device 102A is associated with a channel, and/or engaged in active (e.g., data) communication over a channel having the larger channel width than the channel width of the channel over which the beacon frames 300 are received, the electronic device 102A may apply a correction to the signal strength that is determined based on the beacon frame average. As discussed herein, the correction may be based on the channel width of the channel to which the electronic device 102A is associated and/or over which data frames are being received. For example, the electronic device 102A may determine a correction that is based on the channel width of the channel to which the electronic device 102A is associated and/or over which data frames are being received, and apply the correction to the determined signal strength to determine a corrected signal strength corresponding to that channel. The corrected signal strength may then be used for subsequent control of the electronic device.

Although a correction may be applied to a signal strength determined using only beacon frames as described in connection with FIG. 3 (whether those beacon frames are received adjacent to one another as in the example of FIG. 3 or received with other communications interspersed therebetween), in one or more other implementations, the signal strength may be determined based on a combination (e.g., an average, a median, or other combination) of signal strengths measured using one or more beacons received in a 20 MHz channel and based on signal strengths measured using data (e.g., one or more data frames received over channel having a higher channel width, such as a 40 MHz channel, an 80 MHz channel, a 160 MHz channel etc.), without applying a correction to the combined signal strength that is determined based on both the 20 MHz beacons and higher channel width data frames. In various implementations, a 20 MHz beacon may be received over a higher width channel over which the data is also received, or over a separate 20 MHz channel. For example, a 20 MHz beacon may be received via a 20 MHz sub-channel (e.g., a primary sub-channel, such as a primary sub-channel that is aligned with a preferred scanning channel of a WiFi network) of a 40 MHz channel, an 80 MHz channel, or a 160 MHz channel.

Figure 4:
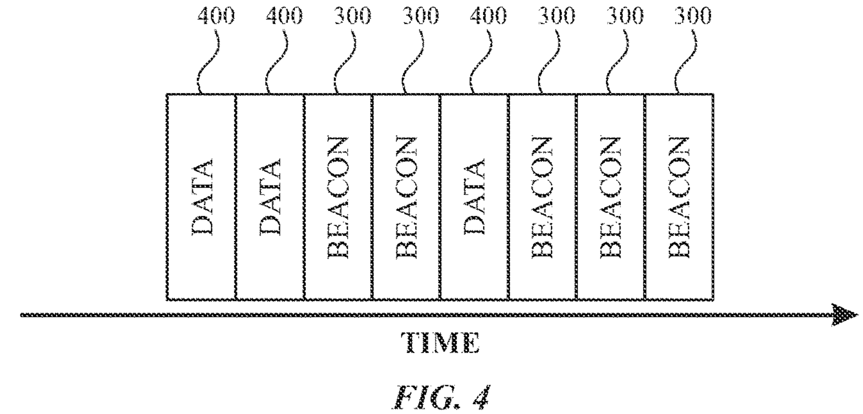
FIG. 4 illustrates an example timing diagram for transmission of beacon frames and data frames in accordance with one or more implementations.

For example, FIG. 4 illustrates an example timing diagram in which data frames 400 and beacon frames 300 (e.g., data frames and beacon frames of a single core, such as a set of data frames and beacon frames received within a predetermined period of time) are transmitted from an AP to the electronic device 102A, any or all of which can be used (e.g., averaged) to determine a signal strength (e.g., an RSSI). In implementations in which the data frames 400 are used to determine the signal strength, that determined signal strength may be used for subsequent device control without applying a correction to the determined signal strength.

In the example of FIG. 4, the beacon frames 300 and the data frames 400 are interleaved, and the beacon frames 300 and the data frames 400 may be sent from the AP to the client device over the same channel or different channels. In one or more use cases, the beacon frames 300 and the data frames 400 may be sent over the same channel having the same channel width and with the same transmit (TX) power. In one or more other use cases, the beacon frames 300 may be sent over a portion (e.g., a 20 MHz portion) of a wider channel (e.g., a 40 MHz channel, an 80 MHz channel, a 160 MHz channel, etc.) over which the data frames 400 are sent. Because the noise floor of progressively wider channels (e.g., a 40 MHz channel, an 80 MHz channel, a 160 MHz channel, etc.) may be progressively higher, an access point such as access point 104 may transmit data frames 400 over the progressively wider channels with a progressively higher transmit power (e.g., so that the signal-to-noise (SNR) remains substantially similar across the channels).

In one or more implementations, a client device (e.g., electronic device 102A) may determine a signal strength of a signal from an access point (e.g., access point 104) based on both the beacon frames 300 and the data frames 400. For example, the electronic device 102A may determine a signal strength based on each of the beacon frames 300 and each of the data frames 400 (e.g., each of the beacon frames 300 and each of the data frames 400 in a single core) shown in FIG. 4, and then average these signal strengths to determine the signal strength of the channel over which the data frames 400 are being received.

As discussed herein, in some implementations, a correction may be applied to a signal strength measured using only beacon frames or other robust frames (e.g., probe response frames) received over a channel having a first channel width (e.g., a 20 MHz channel). In other implementations, the signal strength may be determined using data frames received over channels having higher channel widths (e.g., 40 MHz, 80 MHz, 160 MHz etc.) along with one or more beacon frames received at a lower frequency, without applying a correction to the determined signal strength.

The electronic device 102A may then be controlled (operated) based on signal strength (e.g., with the correction applied if the signal strength is determined using only beacon or probe response frames, or without a correction if data frames are used in determining the signal strength). For example, the electronic device 102A may manage WiFi channel connections based on a distance from the AP 104 that is determined using the correct signal strength for a given channel, rather than a distance that is determined based on an incorrect signal strength. In this way, the subject system enables the electronic device 102A to, for example, avoid unnecessarily reducing the range of a WiFi channel with a channel width above 20 MHz, such as due to an unaccounted for difference in TX power from the AP 104 in that channel relative to the 20 MHz channel.

Figure 5:
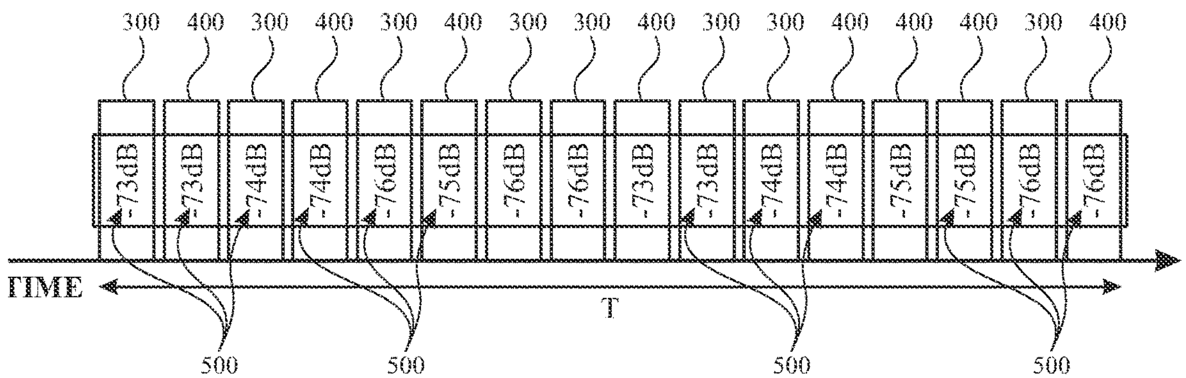
FIG. 5 illustrates another example timing diagram for transmission of beacon frames and data frames in accordance with one or more implementations.
Figure 6:
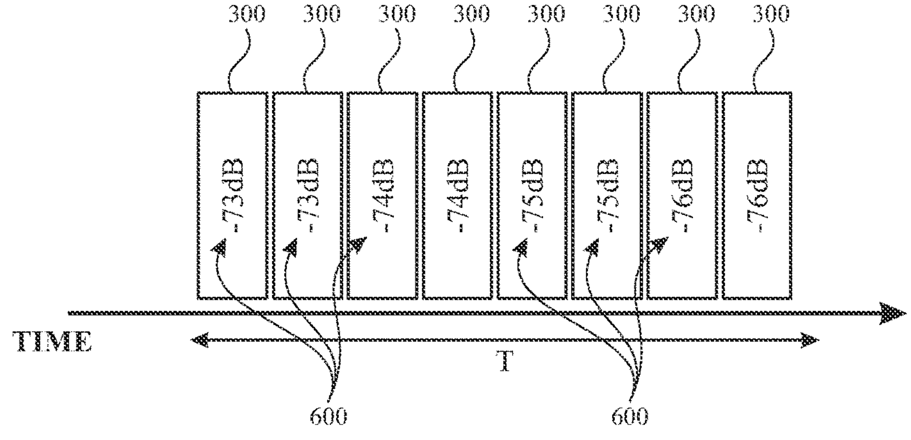
FIG. 6 illustrates another example timing diagram for transmission of beacon frames in accordance with one or more implementations.

FIGS. 5 and 6 illustrate an example implementation in which a signal strength may be determined by combining signal strengths determined from data frames 400 (e.g., high channel width data frames sent over channels with channel widths of 40 MHz, 80 MHz, 160 MHz etc.) with signal strengths determined from one or more beacon frames 300 received on a 20 MHz channel (without applying a correction to the determined signal strength that is determined from a combination of beacon frame signal strengths and data frame signal strengths) in some operational modes of an electronic device, and in which the signal strength is determined using only beacon frames 300 in other modes of operation.

For example, as illustrated in FIG. 5, while the electronic device 102A is operated in an active communication mode (e.g., a mode in which data frames 400 are being received and/or transmitted by the electronic device 102A over a channel having a channel width), the electronic device 102A may obtain a signal strength 500 for each beacon frame 300 and for each data frame 400. For example, the signal strengths 500 may each be a measurement of the energy detected at an antenna of the electronic device 102A, or after the antenna and any cable loss, in connection with the incoming beacon frames 300 and data frames 400. The signal strength 500 for a beacon frame 300 or a data frame 400 may be measured using a preamble of the beacon frame 300 or the data frame 400, or may be averaged over the entire beacon frame 300 or data frame 400. In one or more implementations, the signal strengths 500 may be output from a radio chipset at the electronic device 102A and obtained by other processing circuitry (e.g., a central processing unit or other processor) of the electronic device 102A for further processing for determining the signal strength for the channel. In one or more implementations, the signal strength for the access point and/or for the channel over which the data frames 400 are being transmitted may be measured by computing a combination (e.g., an average, a weighted average, a median, or another combination) of the signal strengths 500 for one or more (e.g., each) of the beacon frames 300 and one or more (e.g., each) of the data frames 400 received within a time window having a length T (e.g., one second or a fraction thereof). In one or more other implementations, a single signal strength for the beacon frames 300 and the data frames 400 in the time window may be determined without first calculating or obtaining individual signal strengths 500 for the individual frames (e.g., by the radio chipset of the electronic device 102A). In one or more implementations, obtaining and then combining the signal strengths 500 can facilitate computation of a weighted average signal strength in which, for example, signal strengths 500 for more recent frames in the time window are weighted more heavily than older frames in the time window.

As illustrated in FIG. 6, in one or more implementations, while the electronic device 102A is operated in a power management mode (e.g., an inactive communication mode in which no data frames 400 are being received and/or transmitted by the electronic device 102A, but during which the electronic device 102A is still associated with the channel over which the data frames 400 are/were received), the electronic device 102A may obtain a signal strength 600 for each of the beacon frames 300 received within a time window having a length T (e.g., one second or a fraction thereof) and within which no data frames are receive. In one or more implementations, the electronic device 102A may then determine the signal strength for the connection to the access point 104 and/or for the channel to which the electronic device 102A is associated by combining (e.g., averaging, weighted averaging, computing a median, or otherwise combining) the signal strengths 600. For example, the signal strengths 600 may each be a measurement of the energy detected at an antenna of the electronic device 102A, or after the antenna and any cable loss, in connection with the incoming beacon frames 300. The signal strength 600 for a beacon frame 300 may be measured using a preamble of the beacon frame 300, or may be averaged over the entire beacon frame 300. In one or more implementations, the signal strengths 600 may be output from a radio chipset at the electronic device 102A and obtained by other processing circuitry (e.g., a central processing unit or other processor) of the electronic device 102A for further processing, such as for combining the signal strengths 600 and/or for applying a correction to the combined signal strength. In one or more other implementations, a radio chipset for the electronic device 102A may generate a combined signal strength from the beacon frames 300 in the time window without calculating individual signal strengths 600 for the beacon frames 300. In one or more implementations, obtaining and then combining the signal strengths 600 can facilitate computation of a weighted average signal strength in which, for example, signal strengths 600 for more recent beacon frames 300 in the time window are weighted more heavily than older beacon frames 300 in the time window.

In the power saving mode (power management mode) illustrated in FIG. 6, the electronic device 102A may then apply a correction, based on the channel width of the channel to which the electronic device 102A is associated and/or over which data frames 400 have been or will be transmitted, to the combined signal strength generated based on the beacon frames 300 in the time window. In this example, the electronic device 102A may use the beacon frames 300 and a correction to determine the signal strength (e.g., a corrected signal strength) when the electronic device 102A is in a power management mode, and may use the data frames 400 in determining the signal strength (without applying a correction) when the electronic device 102A is an active communication mode. In one or more implementations, applying a correction to a measured signal strength may include increasing the measured signal strength by an amount of the correction (e.g., by 3 dB for a 40 MHz channel, by 6 dB for an 80 MHz channel, or by 9 dB for a 160 MHz channel).

Figure 7:
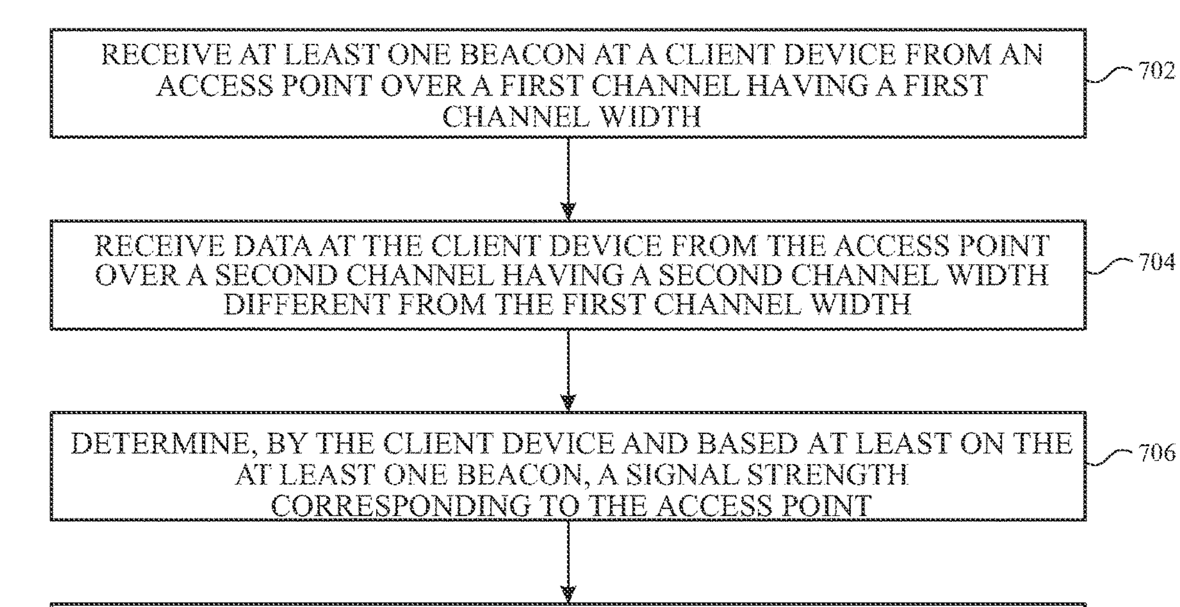
FIG. 7 illustrates a flow diagram of an example process that can be performed for wireless communication in accordance with one or more implementations.

FIG. 7 illustrates a flow diagram of an example process 700 for wireless communication in accordance with one or more implementations. For explanatory purposes, the process 700 is primarily described herein with reference to the electronic device 102A and the wireless access point 104 of FIG. 1. However, the process 700 is not limited to the electronic device 102A and the wireless access point 104 of FIG. 1, and one or more blocks (or operations) of the process 700 may be performed by one or more other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, a first device (e.g., electronic device 102A, such as a client device) may receive at least one beacon (e.g., beacon frames 300) from a second device (e.g., an access point, such as access point 104) over a first channel having a first channel width. The at least one beacon may include one beacon, or may include multiple beacons such as, for example, two, three, four, five, or more than five (e.g., eight) beacon frames, such as beacon frames 300 of FIG. 3, 4, 5, or 6. The first channel width may be, for example, a 20 MHz channel width.

At block 704, the first device may receive data (e.g., data frames 400) from the second device over a second channel having a second channel width different from the first channel width. In one or more implementations, the first channel may be separate from the second channel. In one or more implementations, the first channel may overlap with the second channel (e.g., the first channel may be a sub-channel of the second channel, such as a primary sub-channel of the second channel). For example, the first channel may be a 20 MHz sub-channel of a 40 MHz channel, an 80 MHz channel, or a 160 MHz channel (as examples). In one or more implementations, the first channel and the second channel are first and second channels of a WiFi network, and the first channel is aligned with a primary scanning channel of the WiFi network. In one or more implementations, the data may be associated with a first transmit power, and the beacon may be associated with a second transmit power that is less than the first transmit power. For example, the data may have been transmitted, by the second device, with a higher transmit power than a transmit power with which the multiple beacons have been transmitted by the second device (e.g., 3 dB higher, 6 dB higher, or 9 dB higher respectively for 40 MHz data frames, 80 MHz data frames, or 160 MHz data frames).

At block 706, the first device may determine, based at least on the at least one beacon, a signal strength corresponding to the second device. In one or more implementations, determining the signal strength includes determining a received signal strength indicator (RSSI) based at least on the at least one beacon.

In one or more implementations, determining the signal strength corresponding to the second device based on at least on the at least one beacon may include determining an average signal strength based on multiple beacons received at the first device from the second device over the first channel with the first channel width (e.g., as described herein in connection with FIGS. 3, 4, 5, and/or 6). For example, determining the average signal strength may include determining a signal strength corresponding to each of the multiple beacons, and then averaging the determined signal strengths to determine an average signal strength. In one or more implementations, determining an average signal strength based on the multiple beacons may include determining a weighted average (e.g., based on the multiple beacons). For example, determining the average signal strength may include determining a signal strength corresponding to each of the multiple beacons, obtaining a weight for each of the determined signal strengths, and then averaging the determined signal strengths using the obtained weights to determine an average signal strength. As an example, the weights may be values that weight the signal strengths corresponding to more recent beacons (e.g., a most recent two or three beacons) more heavily than signal strengths corresponding to less recent beacons. In one or more implementations, the weighted average may be a per-core average that includes an average computed using the beacons and the data frames corresponding to a single core. For example, the first device may determine a signal strength corresponding to a second device based at least on a beacon and data by determining the signal strength corresponding to the second device based at least on the beacon, the data, one or more additional beacons, and additional data associated with a single core.

At block 708, the first device may apply, to the signal strength, a correction that is based at least on the second channel width to obtain a corrected signal strength. In one or more implementations, the correction to the signal strength is applied while the first device is in an active communication mode over the second channel. In one or more implementations, the second channel width is a multiple of the first channel width and the correction has a value corresponding to the multiple applied (e.g., on a logarithmic scale) to a base correction factor. For example, the base correction factor may be a log scale correction factor (e.g., 3 dB) for a 40 MHz channel that is double in width to a 20 MHz channel, and respective multiples of 2 and 3 can be applied, in log scale, to the base correction factor to obtain a respective correction factor (e.g., 6 dB and 9 dB) for an 80 MHz channel and a 160 MHz channel. In one or more implementations, the correction for each channel may be based on (e.g., substantially equal to) a difference (e.g., relative to the transmit power with which 20 MHz beacon frames or 20 MHz data frames are transmitted by the second device) in transmit power with which the second device transmits data frames in that channel. In one or more implementations, applying the correction to the signal strength may include adding the correction to the signal strength or subtracting the correction from the signal strength.

In one or more other implementations, the correction is applied to the signal strength while the first device is in a power management mode (e.g., as discussed herein in connection with FIG. 6) in which less power is consumed than in an active communication mode. In these other implementations, the process 700 may also include, while the first device is in an active communication mode, determining the signal strength based at least in part on the at least one beacon and data, and applying the correction to the signal strength determined during the active communication mode (e.g., as discussed herein in connection with FIG. 5).

At block 710, the process 700 may include operating the first device in accordance with the corrected signal strength. For example, operating the first device can include displaying an indicator of the corrected signal strength (e.g., using a display of the first device). In various implementations, operating the first device in accordance with the corrected signal strength may include at least one of: (i) displaying an indicator of the corrected signal strength at the first device or (ii) determining, based on the corrected signal strength, that the first device is at an edge of a range of the second device and performing one or more of: searching for another second device (e.g., another access point), or switching to a communication protocol different from a communication protocol used by the second device. For example, operating the first device can include determining, based on the corrected signal strength, that the first device is at an edge of a range of the second device and (a) searching for another second device or network, or (b) switching to cellular communication or another communication protocol/antenna from the (e.g., WiFi) communication over the second channel).

In one or more implementations, the process 700 may also include applying the correction to the signal strength only when the signal strength satisfies a threshold strength. For example, the first device may determine that the signal strength without the correction has fallen below a threshold strength, and operate the first device based on the signal strength without the correction.

In one or more implementations, the process 700 may also include, prior to receiving at least one beacon and the data from the second device (e.g., during a scan, by the first device for available WiFi channels), determining, by the first device based at least on at least one additional communication from the second device, a bandwidth capability of the second device. The at least one additional communication from the second device may include at least one additional beacon (e.g., an additional beacon frame 300) or a probe response to a probe request sent from the first device to the second device. The process 700 may also include determining an initial signal strength corresponding to the second device based at least on the at least one additional communication, and applying one or more corrections to the initial signal strength to determine one or more respective corrected signal strengths corresponding to one or more respective communication channels provided by the second device. For example, the first device may determine a correction to the initial signal strength for a 40 MHz channel, a correction to the initial signal strength for an 80 MHz channel, and/or a correction to the initial signal strength for a 160 MHz channel (e.g., based on known transmit powers and/or known channel widths for those channels).

In one or more implementations, the first device may receive additional data from the second device over a third channel having a third channel width different from the first channel width and the second channel width, and apply, to the signal strength, an additional correction that is different from the correction and based at least on the third channel width.

In one or more implementations, prior to applying a correction to a signal strength determined using one or more beacons (e.g., beacon frames), a first device may obtain geographical information (e.g., a country code or other regional code that identifies a geographical or political region), and determine whether to apply the correction based on the geographical information. For example, if the first device determines, based on the geographical information, that the first device is being operated in a country or other region in which no increase in transmit power is provided for wider channels, the first device may determine that no correction is to be applied. As another example, if the first device determines, based on the geographical information, that the first device is being operated in a country or other region in which an increase in transmit power is provided for wider channels, the first device may determine that a correction is to be applied as described herein (e.g., using the process 700 of FIG. 7).

In one or more implementations, the first device that is applying a correction to a signal strength determined using beacons may determine that a signal strength from the second device (e.g., an uncorrected signal strength or a corrected signal strength) is below (e.g., has fallen below, such as due to user movement of the first device) a threshold (e.g., a −75 dB threshold), and may stop applying the correction to the signal strength determined using beacons.

In one example, when the signal strength falls below the threshold, the first device may modify communication to a narrower width channel for which a correction is not appropriate.

Figure 8:
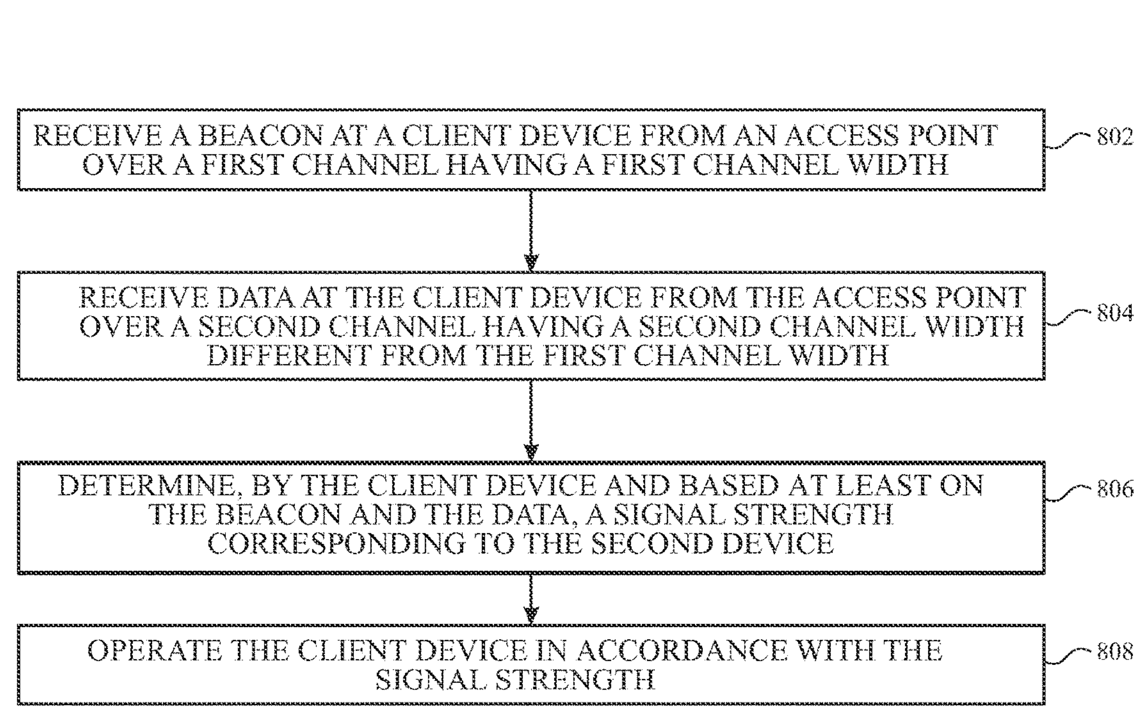
FIG. 8 illustrates a flow diagram of another example process that can be performed for wireless communication in accordance with one or more implementations.

FIG. 8 illustrates a flow diagram of another example process 800 for wireless communication in accordance with one or more implementations. For explanatory purposes, the process 800 is primarily described herein with reference to the electronic device 102A and the wireless access point 104 of FIG. 1. However, the process 800 is not limited to the electronic device 102A and the wireless access point 104 of FIG. 1, and one or more blocks (or operations) of the process 800 may be performed by one or more other suitable devices. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, a first device (e.g., the electronic device 102A, such as a client device) receives a beacon from a second device (e.g., an access point, such as access point 104) over a first channel having a first channel width. For example, the beacon may be received over a 20 MHz channel or a primary scanning channel. In one or more implementations, the first device may also, or alternatively, receive one or more probe response frames from the second device (e.g., responsive to one or more probe requests from the first device).

At block 804, the first device may receive data from the second device over a second channel having a second channel width different from the first channel width. As examples, the second channel may be a 40 MHz channel, an 80 MHz channel, a 160 MHz channel, etc. In one or more implementations, the beacon and the data may be received while the first device is in an active communication mode and/or is associated with the second device.

At block 806, the first device may determine, based at least on the beacon and the data, a signal strength corresponding to the second device (e.g., as described herein in connection with FIG. 5). As an example, determining the signal strength based at least on the beacon and the data may include averaging, weighted averaging, and/or otherwise combining signal strengths measured by the of the beacon and the data. In one or more implementations, determining the signal strength corresponding to the second device based at least on the beacon and the data may include determining the signal strength corresponding to the second device based at least on the beacon, the data, one or more additional beacons, and additional data associated with a single core.

At block 808, the process 800 may include operating the first device in accordance with the determined signal strength. For example, operating the first device can include determining a distance between the first device and the second device and operating the first device based on the distance. For example, operating the first device can include displaying an indicator of the corrected signal strength (e.g., using a display of the first device). As another example, operating the first device can include determining, based on the corrected signal strength, that the first device is at an edge of a range of the second device and (i) searching for another second device (e.g., another access point) or network, or (ii) switching to cellular communications or another communications protocol/antenna from the (e.g., WiFi communications over the second channel).

In one or more implementations, the first device may be in an active communication mode when the beacon and the data are received, and the process 800 may also include receiving an additional beacon at the first device from the second device over the first channel while the first device is in a power management mode with a reduced power consumption relative to power consumption in the active communication mode (e.g., a low power mode in which the first device is not receiving data frames from the second device and is still associated with a channel of the second device). The process 800 may also include determining an updated signal strength based at least on the additional beacon. The first device may (e.g., while the first device is in the power management mode) obtain, based on the second channel width, a correction for the signal strength, and apply the correction to the updated signal strength (e.g., as discussed herein in connection with FIG. 6).

In the example of FIG. 7, irrespective of the mode of operation of the first device, the first device computes signal strengths based on only beacon frames (and/or probe response frames) without using data frames, and applies a correction to the computed signal strengths based on a channel width of a channel to which the first device is associated. In the example of FIG. 8, a first device determines a signal strength based on both beacon frames (and/or probe response frames) and data frames (and does not apply a correction to the determined signal strength) when the first device is in an active communication mode, and determines the signal strength based only on beacon frames (and/or probe response frames) and applies a correction when the first device is in a power management mode or an inactive communication mode.

The operations of FIGS. 7 and 8 can be used exclusively of each other in some implementations, or may be used together in other implementations. For example, in a use case in which a first device determines that beacon frames from the second device are missing, the first device may dynamically switch from the signal strength estimation operations of FIG. 8 to the signal strength operations of FIG. 7 (in one or more implementations). In one or more implementations, because second device operations can affect the data frames, the corrected beacon-only signal strength estimation operations of FIG. 7 may provide a more robust and/or reliable signal strength estimate than the example of FIG. 8 in which data frames are used, in some use cases.

Aspects of the present technology may include the gathering and use of data available from specific and legitimate sources for wireless communication. The present disclosure contemplates that in some instances, this gathered data may include personal information data that uniquely identifies or can be used to identify a specific person. Such personal information data can include image data, video data, audio data, demographic data, location-based data, online identifiers, telephone numbers, email addresses, home addresses, device identifiers, data or records relating to a user's health or level of fitness (e.g., vital signs measurements, medication information, exercise information, EMG signals), date of birth, or any other personal information.

The present disclosure recognizes that the use of such personal information data, in the present technology, can be used to the benefit of users. For example, the personal information data can be transmitted in wireless communications. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates aspects in which users selectively block the use of, or access to, personal information data. That is, the present disclosure contemplates that hardware and/or software elements can be provided to prevent or block access to such personal information data. For example, in the case of wireless communication, the present technology can be configured to allow users to select to “opt in” or “opt out” of participation in the collection of personal information data during registration for services or anytime thereafter. In addition to providing “opt in” and “opt out” options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user’s privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 9:
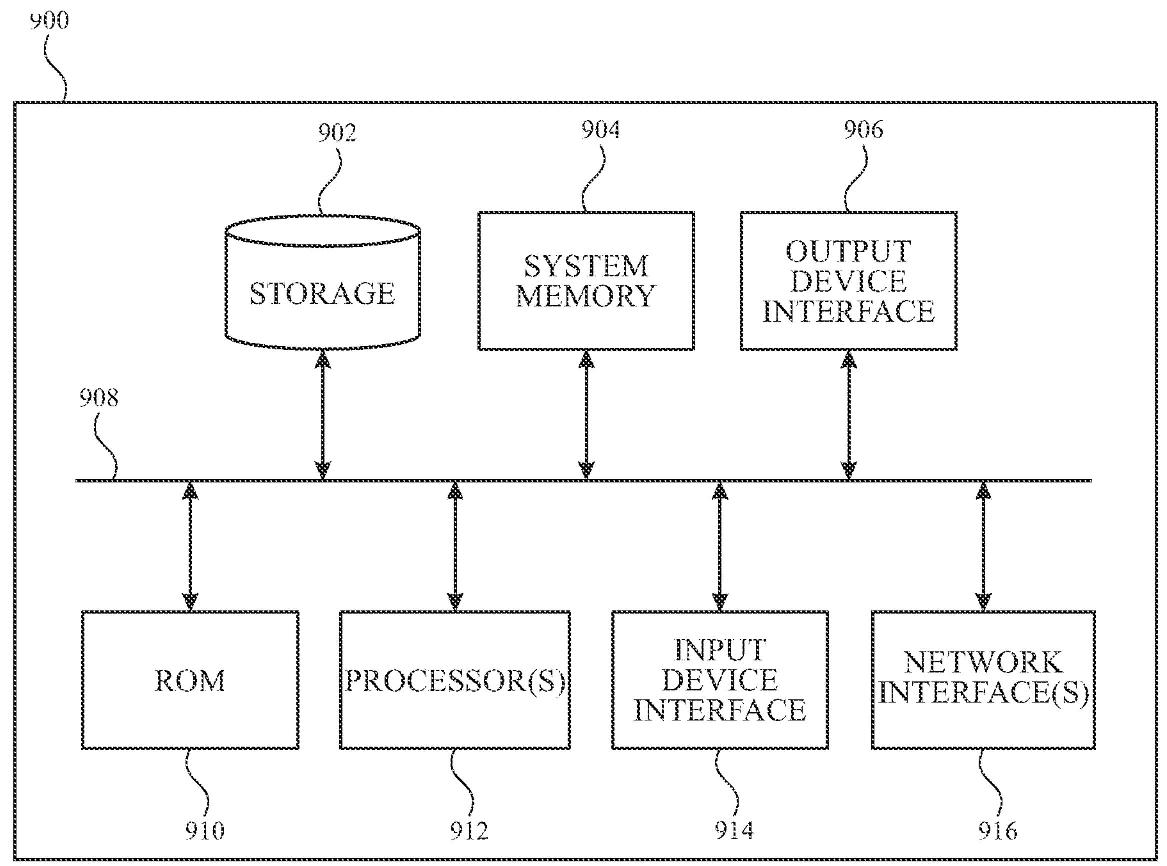
FIG. 9 illustrates an example electronic system with which aspects of the subject technology may be implemented in accordance with one or more implementations.

FIG. 9 illustrates an electronic system 900 with which one or more implementations of the subject technology may be implemented. The electronic system 900 can be, and/or can be a part of, one or more of the electronic devices 102A, 102B, or 102C shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called “cursor control devices”). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes, such as the AP 104 and/or the base station 106 shown in FIG. 1, through the one or more network interface(s) 916. As shown in FIG. 9, the network interface(s) 916 may include a WiFi communications interface (e.g., a WiFi module, which may include one or more WiFi antennas and/or front end circuitry configured to receive and transmit wireless signals in one or more WiFi channels as discussed herein). The network interface(s) 916 may also include one or more of a Bluetooth communication interface, a cellular interface, an NFC interface, a Zigbee communication interface, a WLAN communication interface, a USB communication interface, or generally any communication interface. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

In accordance with aspects of the disclosure, a method is provided that includes receiving at least one beacon at a first device from a second device over a first channel with a first channel width; receiving data at the first device from the second device over a second channel with a second channel width different from the first channel width; determining, by the first device and based on the at least one beacon, a signal strength corresponding to the second device; applying, by the first device to the signal strength, a correction that is based on the second channel width to obtain a corrected signal strength; and operating the first device based at least in part on the corrected signal strength.

In accordance with aspects of the disclosure, a method is provided that includes receiving a beacon at a first device from a second device over a first channel with a first channel width; receiving data at the first device from the second device over a second channel with a second channel width different from the first channel width; determining, by the first device and based on the beacon and the data, a signal strength corresponding to the second device; and operating the first device based at least in part on the signal strength.

In accordance with aspects of the disclosure, an electronic device is provided that includes memory, and one or more processors, where the one or more processors are configured to receive at least one beacon from a second device over a first channel with a first channel width; receive data from the second device over a second channel with a second channel width different from the first channel width; determine, based on the at least one beacon, a signal strength corresponding to the second device; apply, to the signal strength, a correction that is based on the second channel width to obtain a corrected signal strength; and operate the electronic device based at least in part on the corrected signal strength.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:

at a first device:

receiving, from a second device, at least one beacon over a first channel having a first channel width;

receiving data from the second device over a second channel having a second channel width different from the first channel width;

determining, based at least on the at least one beacon, a signal strength corresponding to the second device;

applying, to the signal strength, a correction that is based at least on the second channel width to obtain a corrected signal strength; and operating in accordance with the corrected signal strength.

2. The method of claim 1, wherein the data is associated with a first transmit power, and the beacon is associated with a second transmit power that is less than the first transmit power.

3. The method of claim 1, wherein determining the signal strength corresponding to the second device based at least on the at least one beacon comprises determining an average signal strength based on multiple beacons received from the second device over the first channel.

4. The method of claim 3, wherein determining the average signal strength based on the multiple beacons comprises determining a weighted average.

5. The method of claim 1, wherein the correction is applied to the signal strength while the first device is in an active communication mode over the second channel.

6. The method of claim 1, wherein the correction is applied to the signal strength while the first device is in a power management mode.

7. The method of claim 6, further comprising, while the first device is in an active communications mode, determining the signal strength based at least in part on the at least one beacon and the data, without applying the correction to the signal strength determined during the active communication mode.

8. The method of claim 1, wherein determining the signal strength comprises determining a received signal strength indicator (RSSI) based at least on the at least one beacon.

9. The method of claim 1, wherein operating the first device based at least in part on the corrected signal strength comprises at least one of: (i) displaying an indicator of the corrected signal strength at the first device or (ii) determining, based on the corrected signal strength, that the first device is at an edge of a range of the second device and performing one or more of: searching for another second device, or switching to a communication protocol different from a communication protocol used by the second device.

10. The method of claim 1, wherein the first device comprises a client device and the second device comprises an access point, wherein the first channel and the second channel are first and second channels of a WiFi network, and wherein the first channel is aligned with a primary scanning channel of the WiFi network.

11. The method of claim 1, further comprising:

applying the correction to the signal strength only when the signal strength satisfies a threshold strength.

12. The method of claim 1, further comprising, prior to receiving the at least one beacon and the data from the second device:

determining, by the first device based on at least one additional communication from the second device, a bandwidth capability of the second device, wherein the at least one additional communication from the second device comprises at least one additional beacon or a probe response to a probe request sent from the first device to the second device;

determining an initial signal strength based on the at least one additional communication; and applying one or more corrections to the initial signal strength to determine one or more respective corrected signal strengths for one or more respective communication channels provided by the second device.

13. An electronic device, comprising:

memory; and one or more processors configured to:

receive at least one beacon from a second device over a first channel having a first channel width;

receive data from the second device over a second channel having a second channel width different from the first channel width;

determine, based at least on the at least one beacon, a signal strength corresponding to the second device;

apply, to the signal strength, a correction that is based at least on the second channel width to obtain a corrected signal strength; and operate the electronic device in accordance with the corrected signal strength.

14. The electronic device of claim 13, wherein the second channel width is a multiple of the first channel width and wherein the correction has a value corresponding to the multiple applied to a base correction factor.

15. The electronic device of claim 13, wherein the one or more processors are further configured to:

receive additional data from the second device over a third channel having a third channel width different from the first channel width and the second channel width; and apply, to the signal strength, an additional correction that is different from the correction and that is based at least on the third channel width.

16. The electronic device of claim 13, wherein the one or more processors are configured to determine the signal strength corresponding to the second device at least in part by determining an average signal strength based at least on the at least one beacon and multiple additional beacons.

17. A non-transitory computer readable medium storing instructions which, when executed by one or more processors, cause the one or more processors to:

receive at least one beacon from a device over a first channel having a first channel width;

receive data from the device over a second channel having a second channel width different from the first channel width;

determine, based at least on the at least one beacon, a signal strength corresponding to the device;

apply, to the signal strength, a correction that is based at least on the second channel width to obtain a corrected signal strength; and operate an electronic device in accordance with the corrected signal strength.

18. The non-transitory computer readable medium of claim 17, wherein the second channel width is a multiple of the first channel width and wherein the correction has a value corresponding to the multiple applied to a base correction factor.

19. The non-transitory computer readable medium of claim 17, wherein the instructions, when executed by the one or more processors, further cause the one or more processors to:

receive additional data from the device over a third channel having a third channel width different from the first channel width and the second channel width; and apply, to the signal strength, an additional correction that is different from the correction and that is based at least on the third channel width.

20. The non-transitory computer readable medium of claim 17, wherein the instructions, when executed by the one or more processors, further cause the one or more processors to determine the signal strength corresponding to the device at least in part by determining an average signal strength based at least on the at least one beacon and multiple additional beacons.

* * * * *